United States Patent
Holmberg et al.

(10) Patent No.: US 10,328,433 B2
(45) Date of Patent: Jun. 25, 2019

(54) GYRATORY CRUSHER SPIDER BUSHING ASSEMBLY

(71) Applicant: SANDVIK INTELECTUAL PROPERTY AB, Sandviken (SE)

(72) Inventors: Anne Holmberg, Loddekopinge (SE); Matts-Ake Nilsson, Kopinge (SE); Arvid Svensson, Bunkeflostrand (SE); Fredrik Eriksson, Malmo (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 490 days.

(21) Appl. No.: 15/037,677

(22) PCT Filed: Oct. 29, 2014

(86) PCT No.: PCT/EP2014/073187
§ 371 (c)(1),
(2) Date: May 18, 2016

(87) PCT Pub. No.: WO2015/074843
PCT Pub. Date: May 28, 2015

(65) Prior Publication Data
US 2016/0288129 A1  Oct. 6, 2016

(30) Foreign Application Priority Data
Nov. 19, 2013 (EP) .................................. 13193474

(51) Int. Cl.
*B02C 2/00* (2006.01)
*B02C 2/06* (2006.01)
*B02C 2/04* (2006.01)
*F16C 17/10* (2006.01)

(52) U.S. Cl.
CPC ................. *B02C 2/06* (2013.01); *B02C 2/04* (2013.01); *F16C 17/10* (2013.01)

(58) Field of Classification Search
CPC ..................................... B02C 2/04; B02C 2/06
USPC ......................................................... 241/209
See application file for complete search history.

(56) References Cited

U.S. PATENT DOCUMENTS

| | | | |
|---|---|---|---|
| 1,110,887 A | | 9/1914 | Capen |
| 1,528,741 A | * | 3/1925 | Weston ..................... B02C 2/06 241/212 |
| 1,748,102 A | | 2/1930 | Richard |
| 2,598,548 A | | 5/1952 | Jackson |
| 2,977,057 A | * | 3/1961 | Beyhl ....................... B02C 2/06 241/213 |
| 3,456,889 A | * | 7/1969 | Burkhardt ................ B02C 2/06 241/213 |
| 3,813,047 A | | 5/1974 | Torrence et al. |

(Continued)

FOREIGN PATENT DOCUMENTS

| | | |
|---|---|---|
| BE | 370558 A | 5/1930 |
| BE | 465824 A | 7/1946 |

(Continued)

*Primary Examiner* — Faye Francis
(74) *Attorney, Agent, or Firm* — Corinne R. Gorski

(57) ABSTRACT

A gyratory crusher spider bushing assembly is positionable radially intermediate a topshell spider and a crusher main shaft. The assembly includes a main body to which is attached a radially inner annular wear collar. The collar is formed from a material having enhanced wear resistance than the material of main body.

12 Claims, 6 Drawing Sheets

(56) References Cited

U.S. PATENT DOCUMENTS

| | | | |
|---|---|---|---|
| 4,060,205 A | 11/1977 | Pollak | |
| 5,938,133 A * | 8/1999 | Bayliss | B02C 2/04 241/214 |
| 6,536,694 B2 * | 3/2003 | Van Mullem | B02C 2/06 241/210 |
| 8,070,084 B2 * | 12/2011 | Biggin | B02C 2/06 241/209 |
| 9,592,512 B2 * | 3/2017 | Andersson | B02C 2/06 |

FOREIGN PATENT DOCUMENTS

| | | |
|---|---|---|
| RU | 14532 U1 | 8/2000 |
| SU | 142514 A | 11/1961 |
| WO | 9417913 A1 | 8/1994 |
| WO | 2011139210 A1 | 11/2011 |

\* cited by examiner

GYRATORY CRUSHER SPIDER BUSHING ASSEMBLY

RELATED APPLICATION DATA

This application is a § 371 National Stage Application of PCT International Application No. PCT/EP2014/073187 filed Oct. 29, 2014 claiming priority of EP Application No. 13193474.7, filed Nov. 19, 2013.

FIELD OF INVENTION

The present invention relates to a gyratory crusher spider bushing assembly for positioning radially intermediate a topshell spider and a crusher main shaft.

BACKGROUND ART

Gyratory crushers are used for crushing ore, mineral and rock material to smaller sizes. Typically, the crusher comprises a crushing head mounted upon an elongate main shaft. A first crushing shell is mounted on the crushing head and a second crushing shell is mounted on a frame such that the first and second crushing shells define together a crushing gap through which the material to be crushed is passed. A driving device is arranged to rotate an eccentric assembly about the lower portion of the shaft so as to cause the crushing head to perform a gyratory pendulum movement and crush the material introduced in the crushing gap.

Typically, the main shaft is mounted at its upper end by a top bearing assembly in turn mounted within a spider. The main shaft and internal region of the spider are protected from wear via a sleeve that is typically friction fitted over the upper end of the main shaft and a floating spider bushing that protects the inward facing surface of the spider. Conventional sleeve and bushing assemblies are described in U.S. Pat. Nos. 1,110,887; 1,748,102; 2,598,548; 4,060,205 and WO 2011/139210.

Typically, the spider bushing is manufactured from grey iron which facilitates manufacture and is low cost. However, existing bushings are disadvantageous as they exhibit relatively low wear resistance and require frequent replacement. Accordingly, what is required is a spider bushing that addresses these problems.

SUMMARY OF THE INVENTION

It is an objective of the present invention to provide a spider bushing configured to protect the radially inner region of the topshell spider and that offers enhanced wear resistance over conventional bushings whilst minimising an amount of higher performance material forming a part of the bushing assembly. It is a further objective to provide a bushing assembly that is compatible for use with existing crushers and in particular topshell spiders without the need for modification of any surfaces, regions or additional components associated with mounting or stabilising the main shaft at its upper region within the spider.

Accordingly, the inventors provide a bushing assembly having a general shape and configuration configured to match existing bushings that exhibits enhanced wear resistance in response to the gyroscopic precession of the main shaft within the crusher and in particular the central bore of the spider. The objectives are achieved by configuring the bushing as a multi-component assembly in which an annular main body (bushing) forms the majority component of the assembly and provides a mounting for a radially inner wear collar. Advantageously, the present collar is formed from or comprises a material that exhibits increased wear resistance relative to a material of the main body. The present assembly is particularly beneficial as the relative size, both with respect to the axial length and radial thickness of the collar is minimised relative to the main body such that a volume of the wear resistant material of the collar is maintained to a minimum. This is further achieved by the relative positioning of the collar at the main body such that the collar is configured to contact the main shaft (or protective main shaft sleeve) and avoid or minimise the touching contact between the main shaft and the main body of the bushing assembly.

According to a first aspect of the present invention there is provided a gyratory crusher spider bushing assembly for positioning radially intermediate a topshell spider and a crusher main shaft configured for gyroscopic precession within a crusher, the assembly comprising: an annular main body extending around an axis of the assembly and having a radially outward facing surface for positioning opposed to the topshell spider and a radially inward facing surface for positioning opposed to the main shaft or a sleeve surrounding the main shaft, the main body formed from a first material; the main body comprising a first end having a mount flange extending radially outward and a second end intended to be positioned lowermost within the crusher relative to the first end; an annular wear collar positioned at the inward facing surface and extending radially inward from the main body to contact the main shaft or the sleeve; the collar mounted at the main body to prevent independent rotation of the collar about the axis relative to the main body; characterised in that: the collar comprises: a second material having a wear resistance greater than the first material; and an axial length corresponding to a distance between a first end and a second end of the collar that is less than that 75% of an axial length the main body corresponding to a distance between the first end of the main body and a region of the main body aligned at the same axial position as the second end of the collar; the collar positioned axially closest to the second end of the main body relative to the first end of the main body.

Reference within the specification to the 'axial length of the main body' represents a distance in the axial direction between two regions of the main body and not necessarily a complete axial length of the main body as represented between an uppermost end surface and a lowermost end surface. Reference to an 'axial length of the main body' is a distance that is relative to a position and/or a distance in the axial direction of the annular wear collar or at least a part of the collar. Additionally, reference within the specification to an 'axial length of the collar' encompasses a total axial length of the collar between a first uppermost end surface and a second lowermost end surface, with the collar positioned within the bushing assembly and mounted within the crusher according to normal use.

Advantageously, the axial length of the collar is appreciably less than the axial length of the main body to maintain to a minimum the volume of the collar and in particular the higher performance material of the collar that is utilised. The present bushing assembly is advantageous via the specific axial locking of the collar at the lowermost region of the bushing which is the region of contact between the bushing assembly and the main shaft (or intermediate main shaft sleeve). Accordingly, an axially upper region of the main body is devoid of the collar and hence the amount of higher performance material is minimised.

Preferably, the axial length of the collar is less than 75% or 60% of an axial length of the main body. More preferably, the axial length of the collar is in the range 20% to 60% or 40% to 60% of the axial length of the main body. Preferably, the collar is positioned exclusively axially within a lower region of the main body closest to the second end relative to the first end such that an upper region of the main body closest to the first end is devoid of the collar. The majority of collar is positioned in a lower half of the main body to allow an axially upper region of the main body to taper radially outward to accommodate the gyroscopic movement of the main shaft and sleeve.

Optionally, the inward facing surface and/or the collar comprises a radially extending abutment to axially separate and prevent the collar from moving axially towards the first end. The abutment may be formed as one or a plurality of radial projections extending radially inward from the bushing and/or radially outward from the collar. Advantageously, the abutment is configured to prevent or inhibit axial upward movement of the collar relative to the bushing in response to the gyroscopic precession of the main shaft within the bushing assembly. That is, the abutment locks the collar at an axially lower position within the main body. Additionally, the collar may be attached to the main body via separate attachments that provide a radial lock of the collar at the main body.

Optionally, the abutment comprises a step configuration at the inward facing surface of the main body. The step configuration may comprise a recess at the inward facing surface extending axially from the second end, the recess terminated at an axially upper region by an annular shoulder such that the collar is at least partially accommodated within the recess and the first end of the collar abuts the annular shoulder. The recess is advantageous to inhibit axial upward displacement of the collar relative to the main body. Optionally, the collar may be seated within the recess in direct contact with the radially inward facing surface of the main body. Alternatively, an intermediate sleeve or one or a plurality of mounting elements may be positioned radially between the collar and the main body (at the region of the recess) to provide correct seating and alignment of the collar relative to the main body and/or the main shaft or protective main shaft sleeve. Optionally, the collar may be biased radially inward by at least one biasing element positioned at the region of the groove and/or main body. Preferably, the inward facing surface at the recess is aligned substantially parallel with the axis and the inward facing surface of the main body axially between the first end and the recess is aligned transverse to the axis.

The physical or mechanical properties of second material relative to the first material may comprises any one of a combination of: a material that has a higher hardness; a softer material having reduced friction or friction coefficient; a material that has a lower surface pressure. Advantageously, the wear resistant second material provides an increased time period between maintenance or service intervals. Within this specification the relative wear resistance of the first and second material refers, in part, to their abrasion characteristics and in particular the amount of material that would be removed through abrasion testing that may typically involve monitoring the volume of material removed from a test sample for a particular time interval when exposed to a grinder under standard control conditions including: temperature, applied force, speed of relative surface movement between the grinder and the sample body etc.

Rotatably locking the collar at the main body such that the collar is prevented from independent rotation about the central axis relative to the main body is advantageous to avoid accelerated wear of the main body given the differences in the physical or mechanical properties (wear resistance) of the collar and the main body. Preferably, the assembly further comprises a plurality of attachment elements extending between the collar and the main body. Optionally, the attachment elements are aligned coaxially with the main body and/or the collar and are positioned axially at or towards the second end of the main body. Optionally, the attachment elements comprise bolts, screw, pins, rivets, interlocking flanges, tong and groove arrangements and the like. Where the attachment elements comprise bolts, screws or pins, the elements may be aligned coaxially with the main body and/or the collar. The attachment elements are advantageous to rotatably lock the collar to the main body of the bushing to prevent any wear of the bushing due to undesirable rotation of the collar whilst being accessible for convenient mounting and demounting the collar at the bushing assembly.

Optionally, the collar may be friction fitted within the main body optionally via a thermal shrink-fitting process applied to the collar and/or a thermal expansion and contraction of the main body. Optionally, the collar may be held at the main body exclusively by friction forces created by the geometry and dimensions of the collar relative to the main body such that the collar may be oversized relative to the region of the main body with which it mates.

Within the present assembly, the flange provides a means of mounting the assembly at the central boss of the spider optionally via a plurality of anchorage bolts or the like. The flange also prevents any axially downward movement of the bushing assembly.

According to a specific implementation, the second end of the collar comprises a chamfer to decrease a radial thickness of the collar at the second end between an inward and an outward facing surface of the collar. The chamfer accordingly provides a smooth transition at the axially lower region of the assembly for mating against an annular sealing ring positioned at the axially lower second end.

Preferably, the collar is positioned axially between the first and second ends of the main body such that the second end of the collar is axially separated from the second end of the main body. This is advantageous to create an annular cavity region at the second lowermost end of the main body to accommodate the sealing ring and lubrication oil. Preferably, a radial thickness of the main body between the inward and outward facing surfaces is greater than a radial thickness of the collar between a radially inward and radially outward facing surface of the collar. The radial thickness of the collar is maintained to a minimum to minimise the volume of the wear resistant material incorporated as part of the assembly.

Optionally, the first material may comprise a metal, a polymer, a ceramic, a steel, a steel alloy or in particular grey iron. Optionally the second material comprises any one or a combination of the set of: a metal or metal alloy; a copper/zinc based alloy; a manganese steel; a polymer; a ceramic.

Optionally, the inward facing surface of the main body is aligned transverse to the axis of the assembly to tilt radially outward such that a radial separation distance of said inward facing surface at an axial position of the first end of the main body is more than a radial separation distance of said inward facing surface at an axial position at or towards the abutment. The foot is advantageous to hook around an inner region of the annular sealing ring so as to maintain both the radial and axial position of the sealing ring relative to the main body, the spider boss and the main shaft and/or protective main shaft sleeve.

According to a second aspect of the present invention there is provided a gyratory crusher comprising an assembly as claimed herein.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
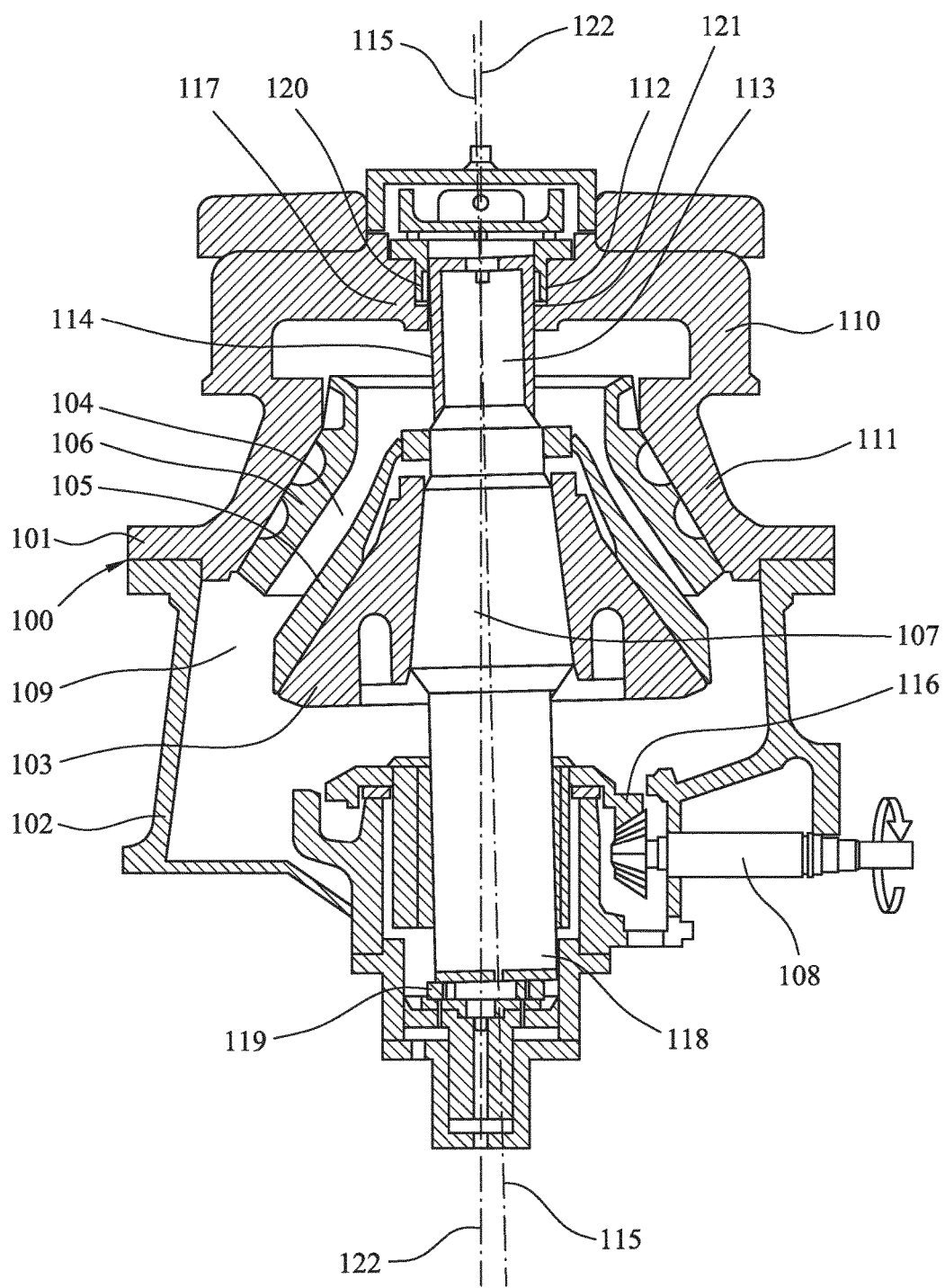
FIG. 1 is a cross sectional side view of a gyratory crusher in which an upper end of a main shaft is seated at least partial within a spider via a spider bushing formed from a main body and an inner wear collar according to a specific implementation of the present invention.
Figure 2:
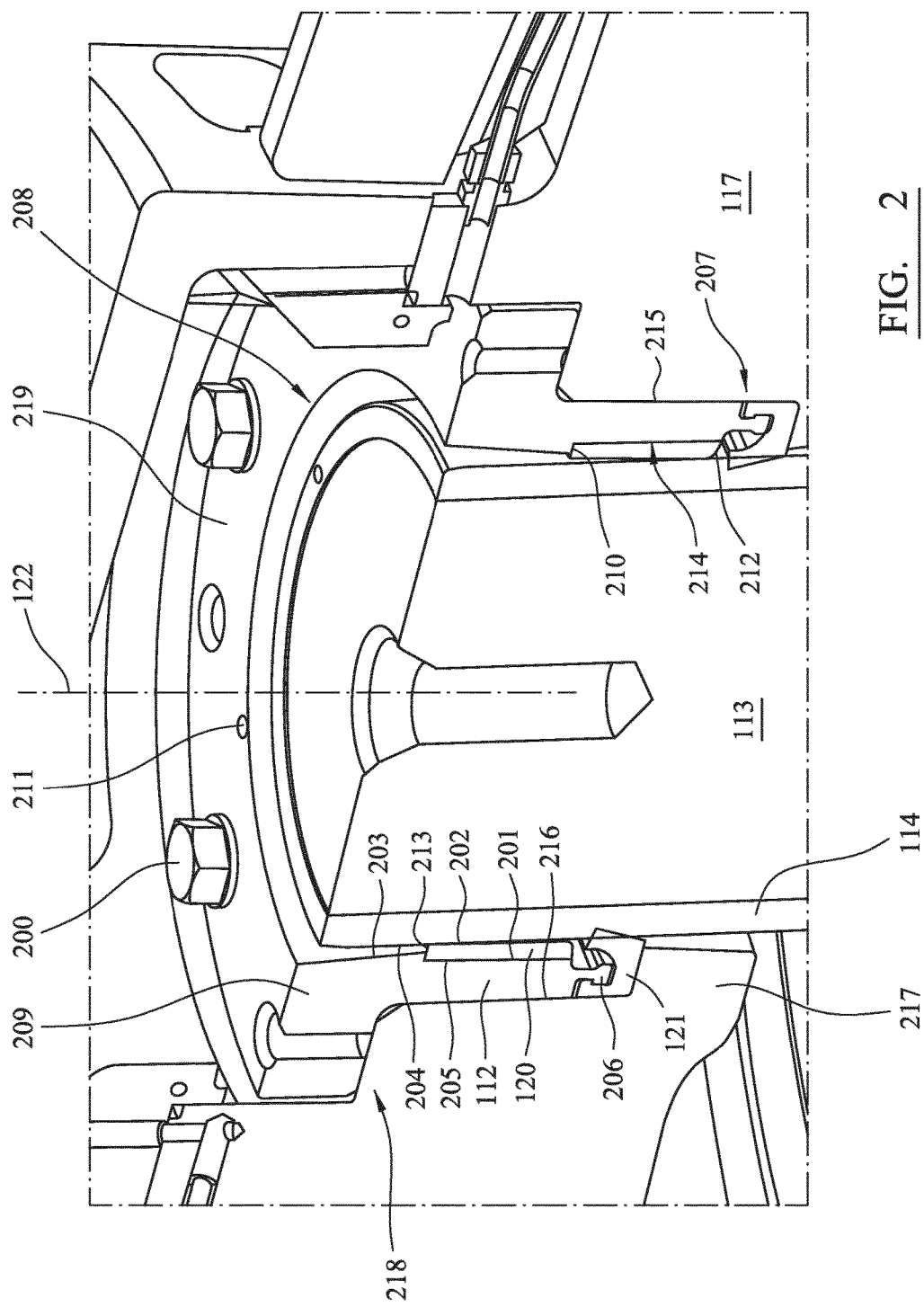
FIG. 2 is a magnified perspective view of the spider bushing assembly of FIG. 1 positioned about the upper end of the main shaft.
Figure 3:
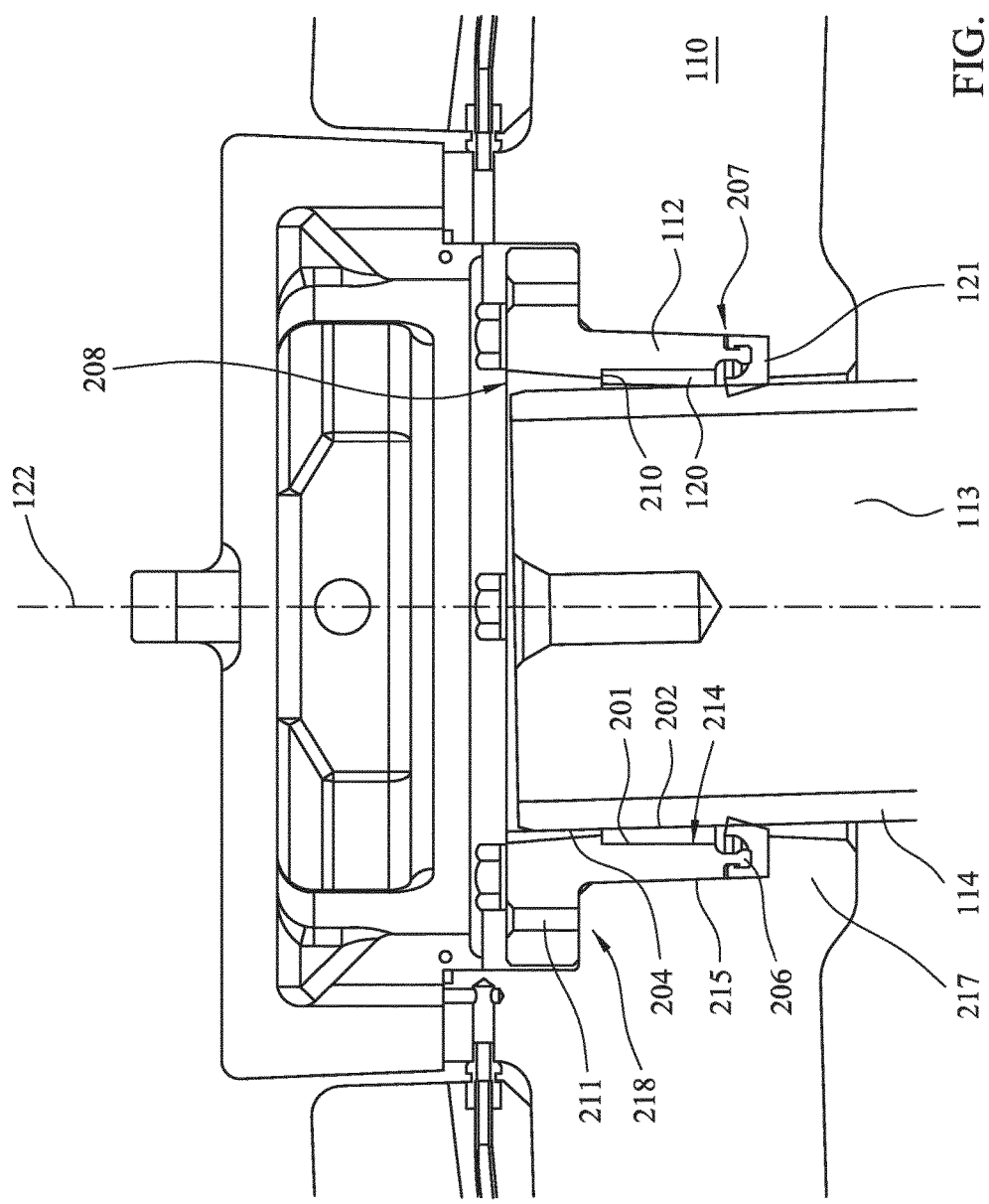
FIG. 3 is a cross sectional side view of the spider bushing assembly of FIG. 2 positioned about the upper end of the main shaft.
Figure 4:
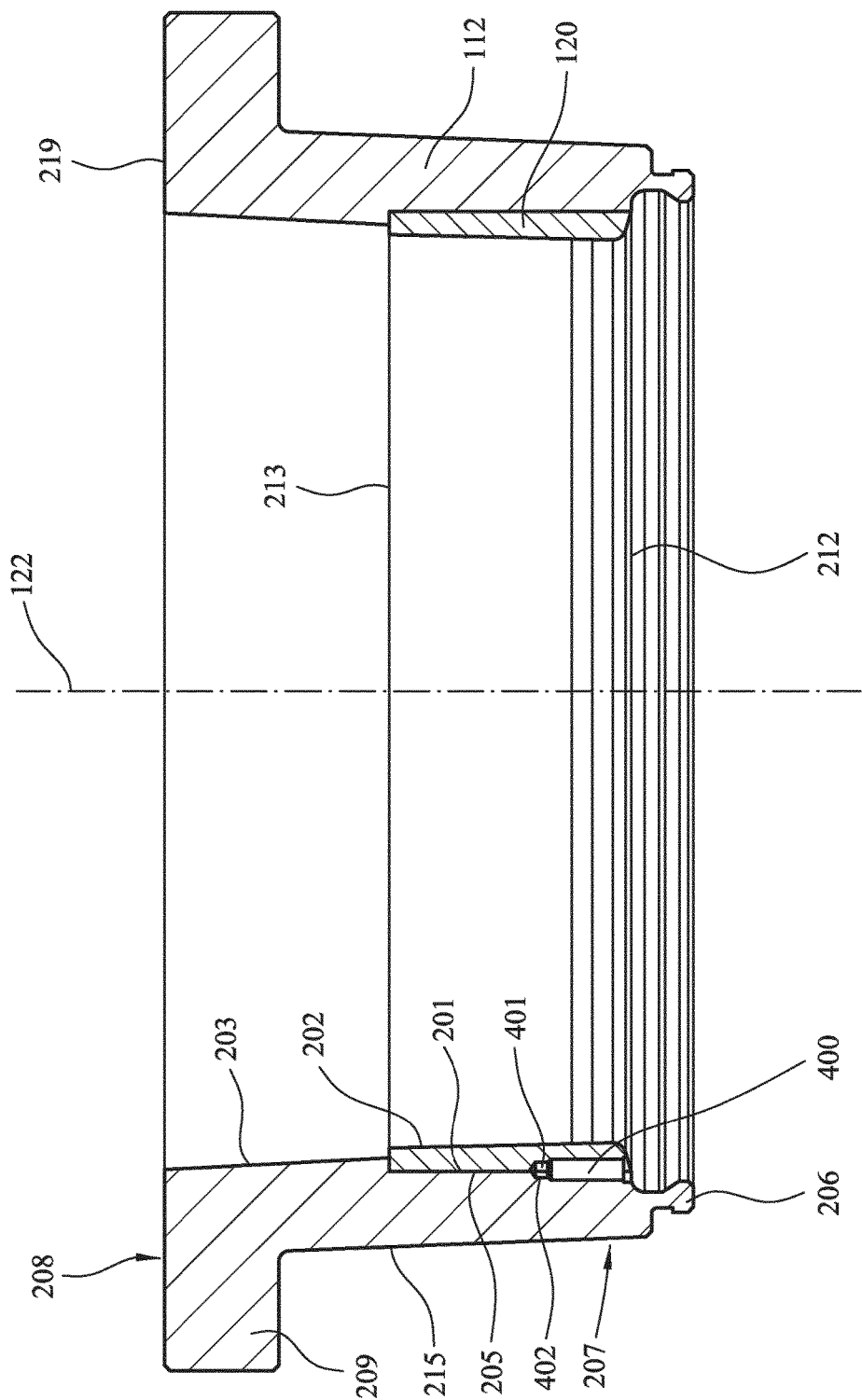
FIG. 4 is a cross sectional side view of the spider bushing of FIG. 3 removed from the main shaft.

Referring to FIG. 1, a crusher comprises a frame 100 having an upper frame 101 and a lower frame 102. A crushing head 103 is mounted upon an elongate shaft 107 having longitudinal axis 115. A first (inner) crushing shell 105 is fixably mounted on crushing head 103 and a second (outer) crushing shell 106 is fixably mounted at upper frame 101. A crushing zone 104 is formed between the opposed crushing shells 105, 106. A discharge zone 109 is positioned immediately below crushing zone 104 and is defined, in part, by lower frame 102.

A drive (not shown) is coupled to main shaft 107 via a drive shaft 108 and suitable gearing 116 so as to rotate shaft 107 eccentrically about a longitudinal axis 122 of the crusher and to cause head 103 and mantle 105 to perform a gyratory pendulum movement and crush material introduced into crushing zone 104. Accordingly the longitudinal axis 115 of main shaft 107 oscillates about crusher longitudinal axis 122. An upper end region 113 of shaft 107 is maintained in an axially rotatable position by a top-end bearing assembly and a spider bushing 112 positioned intermediate between main shaft region 113 and a central boss 117 positioned about axis 122. Similarly, a bottom end region 118 of shaft 107 is supported by a bottom-end bearing assembly 119.

Upper frame 101 comprises a topshell 111, mounted upon lower frame 102 (alternatively termed a bottom shell), and a spider assembly 110 that extends from topshell 111 and represents an upper portion of the crusher. The spider 110 comprises two diametrically opposed arms that extend radially outward from central boss 117. The spider arms are attached to an upper region of topshell 111 via an intermediate annular flange such that the spider arms and topshell 111 form a unitary structure and are formed integrally.

Upper shaft end region 113 is protected and encased by an annular sleeve 114. Spider bushing 112 is positioned at central boss 117 to contact the radially outward facing surface 204 of sleeve 114 as sleeve 114 rotates within central boss 117. An annular wear collar 120 is mounted coaxially and radially intermediate an axially lower region of bushing 112 and shaft sleeve 114 to provide a seat for the rotating sleeve 114 that, due to the relative dimensions and positioning of wear collar 120 is prevented from contact with bushing 112. This is advantageous to obviate the requirement for replacement of the entire bushing 112 which would otherwise wear due to the rotating frictional contact with sleeve 114. Collar 120 may be attached at bushing 112 via specific attachment elements as described herein or may be thermally shrink-fitted within the bushing 112. Accordingly, in some embodiments, collar 120 may be removed and replaced at bushing 112 when worn. Alternatively, the entire assembly may be designed to be replaced follow wear of collar 120. Additionally, it is advantageous for collar 120 to comprise a different material to that of bushing 112 so as to be optimised for wear resistance. As the general size and geometry of collar 120 is significantly less than bushing 112, the increased cost of the wear resistant material is maintained to a minimum which would otherwise be prohibitive if implemented as part of the much larger bushing 112.

Referring to FIGS. 2 to 6, bushing 112 comprises a generally annular sleeve-like body that extends around axis 122 and is positioned centrally within spider boss 117. Bushing 112 comprises a radially inward facing surface 203 at an axially upper half and a corresponding radially inward facing surface 201 at an axially lower half. Inner surface 201 is stepped radially outward from axis 122 relative to inner surface 203 to create an annular shoulder 210 at the inner region of bushing 112 positioned approximately at a mid-axial region between a first axially upper end 208 and a second axially lower end 207 of bushing 112. An opposed radially outward facing surface 215 of bushing 112 is configured for contact and mating against a radially inward facing surface 216 of spider boss 117. The region between the outward facing surface 215 and inward facing surfaces 201, 203 defines the annular wall of bushing 112. An annular flange 209 projects radially outward from the first upper axial end 208 to seat bushing 112 at an annular ledge 218 formed at an upper region of central boss 117. First end 208 is defined by an axially uppermost surface 219 of flange 209. A plurality of anchorage bolts 200 extend axially through flange 209 and into ledge 218 to rotatably lock bushing 112 relative to axis 122 and central boss 117. A plurality of boreholes 211 also extend axially through flange 209 to provide a conduit for lubrication oil and the like to the region between bushing 112 and sleeve 114. As illustrated in FIGS. 2 to 6, the axially upper radially inward facing surface 203 slopes radially inward towards axis 122 from upper end 208 towards annular shoulder 210 such that surface 203 is aligned transverse to axis 122. This provides the necessary clearance to accommodate the gyroscopic precession of the main shaft region 113 and sleeve 114 within the boss 117. The axially lower inward facing surface 201 is arranged transverse to upper surface 203 and is aligned substantially parallel to axis 122. This provides a seat to align collar 120 coaxially with axis 122. An axially lower end of bushing 112 terminates at an annular foot 206 configured to seat and positionally retain a sealing ring 121 (formed form a deformable material such as rubber or a polymer) releasably mounted at (and in particular below) the second lower axial end 207 of bushing 112.

Wear collar 120 comprises a generally annular sleeve-like body having a radially inward facing surface 202 and a radially outward facing surface 205 extending axially between a first upper end 213 and a second lower end 212. A radial wall thickness of collar 120 is less than the corresponding wall thickness of bushing 112 between the opposed and respective inward and outward facing surfaces 202, 205 and 201, 215. In particular, the radial wall thickness of collar 120 is approximately equal to or less than half the corresponding wall thickness of wall bushing 112. First end 213 of collar 120 is configured to abut annular shoulder 210 to prevent upward axial movement of collar 120 beyond the annular recess 214 that is indented at the inner region of collar 120 and defined by the radially inward facing surface 201 and shoulder 210. Due to the relative radial length of shoulder 210 and the radial wall thickness of collar 120, collar 120 projects radially inward from inward facing surfaces 201, 203 of bushing 112 so as to stand internally 'proud' of bushing 112 when mounted in position as shown in FIGS. 2 to 6.

Figure 5:
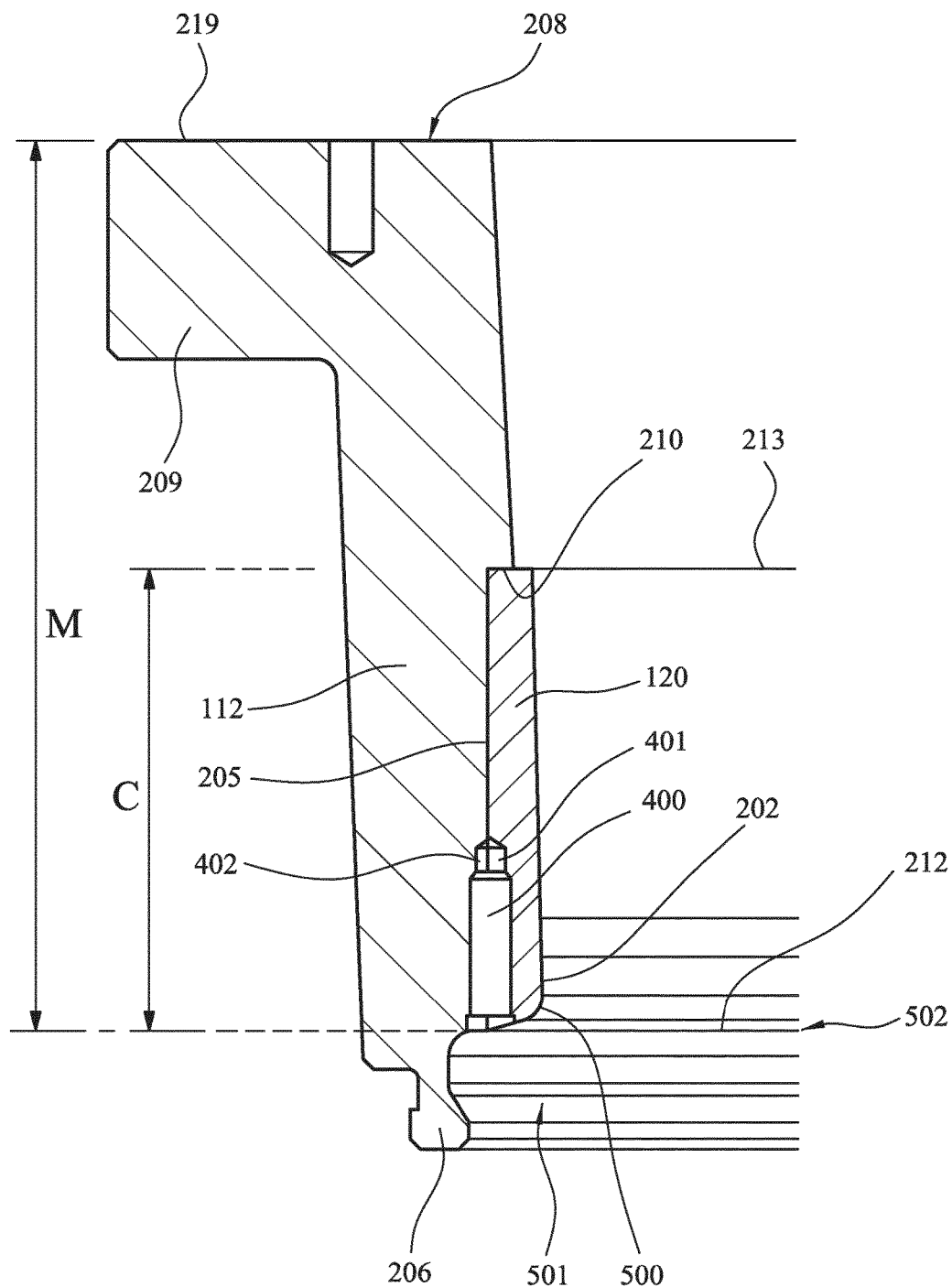
FIG. 5 is a magnified cross sectional view of a part of the spider bushing assembly of FIG. 4.
Figure 6:
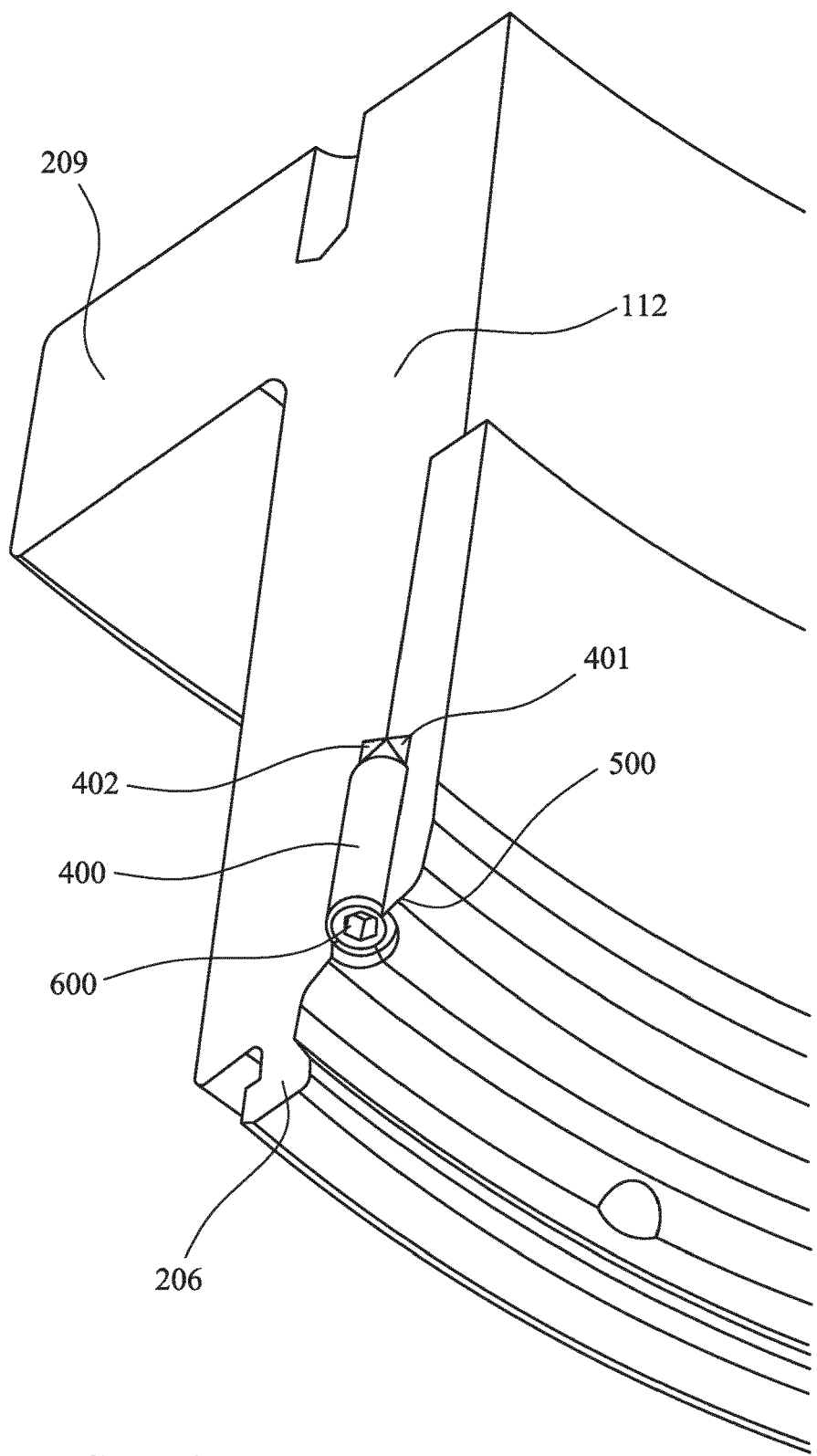
FIG. 6 is a lower perspective view of the magnified region of the spider bushing assembly of FIG. 5.

The radially inward facing surface 202 of collar 120 comprises a chamfer 500 at second end 212 as illustrated in FIGS. 5 and 6. That is, inward facing surface 202 tapers outwardly at chamfer 500 towards the outward facing surface 205. This configuration provides a smooth transition with an annular curved region 501 of bushing 112 that extends radially inward from foot 206 at bushing second end 207. Region 501 provides an annular cavity to accommodate a part of sealing ring 121 and a volume of lubricant oil. Sealing ring 121 is further held in position and trapped axially against foot 206 by an annular rim 217 that projects radially inward at an axially lower region of central boss 117.

Collar 120 is rotatably and axially locked at bushing 112 by a plurality of attachment elements formed as threaded bolts (or screws) 400. Each bolt 400 is received respectively within a threaded bore that extends axially upward from a region of bushing second end 207 and the second end 212 of collar 120. In particular, each bore is formed by cooperatively mated part cylindrical recesses 401, 402 embedded within the respective axially lower ends of collar 120 and bushing 112. Accordingly, each bolt 400 is positioned at the junction between the collar outward facing surface 205 and the bushing inward facing surface 201 at the respective lower second ends 212, 207. In this configuration, collar 120 may be conveniently attached and demounted at bushing 112 via the axially extending bolts 400 being accessible from the axially lower region of central boss 117 when shaft 107 and sleeve 114 are removed. Accordingly, each bolt 400 comprises a drive head 600 engageable by a suitable tool.

According to further specific implementations, collar 120 may be attached and rotatably locked at bushing 112 via any convenient means of attachment. Such attachment arrangements may comprise tong and groove configurations in which collar 120 slides axially upward within bushing 112 and is then rotated to locate anchorage lugs extending radially from collar 120 into anchorage recesses indented on the inward facing surface of bushing 112.

According to yet further specific implementations, collar 120 and bushing 112 may comprise cooperating screw threads formed at respective surfaces 205 and 201. Locking pins, bolts, rivets or flanges may then anchor collar 120 at bushing 112 with such locking elements provided at the second axially lower regions 207, 212 of the respective bushing 112 and collar 120.

To reduce wear and extend the longevity of collar 120, collar 120 comprises a material different to a material of bushing 112. In particular, collar 120 comprises a metal, ceramic or polymer material having enhanced wear resistance relative to the material of bushing 112 which is typically grey iron. In one specific implementation, collar 120 comprises a bronze alloy. This is particularly advantageous to allow shrink-fitting of collar 120 at bushing 112 (to provide a secure friction-fit arrangement) optionally followed by subsequent mounting of bolts 400 within respective bores 401, 402.

When assembled as illustrated in FIGS. 1 to 6, radially inward facing surface 202 of collar 120 is positioned for mating contact against a radially outward facing surface of main shaft sleeve 114. The upper end region 113 of shaft 107 is capable of gyroscopic precession within the annular bore of the bushing assembly that is defined by the inward facing surface 203 of bushing 112 and surface 202 of collar 120. Following extended use, collar 120 may be readily demounted and replaced at bushing 112 without any wear or damage to bushing 112 due to the rotation of sleeve 114 and shaft region 113 within boss 117. The present bushing assembly is therefore advantageous to reduce the amount of material that is required to be replaced and to optimise the physical and mechanical characteristics of the selected components of the assembly suitable for wear resistance as effective wear parts.

Referring to FIG. 5, an axial length M of bushing 112 is defined as the axial distance between the bushing first end 208 (corresponding to uppermost annular surface 219) and the bushing second end 207 and in particular a region 502 of bushing 112 that is aligned at the same axial position as the lowermost second end 212 of collar 120. Region 502 is accordingly positioned axially between the bushing first 208 and second 207 ends and axially above the foot 206. Additionally, a relative axial length C of collar 120 is defined as the axial distance between the respective collar first 213 and second 212 ends and corresponds to a total axial length of collar 120.

According to the specific implementation, axial length M is greater than axial length C and in particular, length C is less than 75% (and optionally less than 60%) of length M. Accordingly, collar 120 does not extend into the axially upper region of bushing 112. Such an arrangement is advantageous to optimise the volume of the higher performance material of collar 120 within the present bushing assembly.

The invention claimed is:

1. A gyratory crusher spider bushing assembly comprising:
    an annular main body extending around an axis of the assembly, the main body having a radially outward facing surface and a radially inward facing surface, the main body being formed from a first material, the main body including a first end having a mount flange extending radially outward and a second end;
    an annular wear collar positioned at the inward facing surface and extending radially inward from the main body, the collar being mounted at the main body to prevent independent rotation of the collar about the axis relative to the main body, the collar including a second material having a wear resistance greater than the first material;
    an axial length of the collar corresponding to a distance between a first end and a second end of the collar that is less than that 75% of an axial length of the main body, the axial length of the main body corresponding to a distance between the first end of the main body and a region of the main body aligned at the same axial position as the second end of the collar, the collar being positioned axially closest to the second end of the main body relative to the first end of the main body; and a radially extending abutment at the inward facing surface and/or the collar, the abutment being arranged to axially separate and prevent the collar from moving axially towards the first end of the main body, wherein the inward facing surface of the main body is aligned transverse to the axis of the assembly to tilt radially outward such that a radial separation distance of the inward facing surface at an axial position of the first end of the main body is more than a radial separation distance of the inward facing surface at an axial position at or towards the abutment.

2. The assembly as claimed in claim 1, wherein the axial length of the collar is less than 60% of the axial length of the main body.

3. The assembly as claimed in claim 1, wherein the abutment at the inward facing surface of the main body has a step configuration.

4. The assembly as claimed in claim 3, wherein the step configuration includes a recess at the inward facing surface extending axially from the second end of the main body, the recess being terminated at an axially upper region by an annular shoulder such that the collar is at least partially accommodated within the recess and the first end of the collar abuts the annular shoulder.

5. The assembly as claimed in claim 4, further comprising a plurality of attachment elements extending between the collar and the main body.

6. The assembly as claimed in claim 5, wherein the plurality of attachment elements are aligned coaxially with the main body and/or the collar and are positioned axially at or towards the second end of the main body.

7. The assembly as claimed in claim 6, wherein the collar is positioned exclusively axially within a region of the main body closest to the second end of the main body relative to the first end such that a region of the main body closest to the first end is devoid of the collar.

8. The assembly as claimed in claim 1, wherein the axial length of the collar is in the range of 20 to 60% of the axial length of the main body.

9. The assembly as claimed in claim 1, wherein physical or mechanical properties of the second material of the collar relative to the first material of the main body include anyone of a combination of a material that has a higher hardness; a softer material having reduced friction or friction coefficient; and a material that has a lower surface pressure.

10. The assembly as claimed in claim 1, wherein the second material includes any one or a combination of the set of a metal or metal alloy; a copper/zinc based alloy; a manganese steel; a polymer; and a ceramic.

11. The assembly as claimed in claim 1, wherein a radial thickness of the main body between the inward and outward facing surfaces is greater than a radial thickness of the collar between a radially inward and a radially outward facing surface of the collar.

12. The assembly as claimed in claim 1, wherein the second end of the collar includes a chamfer to decrease a radial thickness of the collar at the second end between an inward and an outward facing surface of the collar.

* * * * *